Nov. 12, 1946.  H. L. BRIONES  2,410,957
FLY SWATTER
Filed Nov. 3, 1944
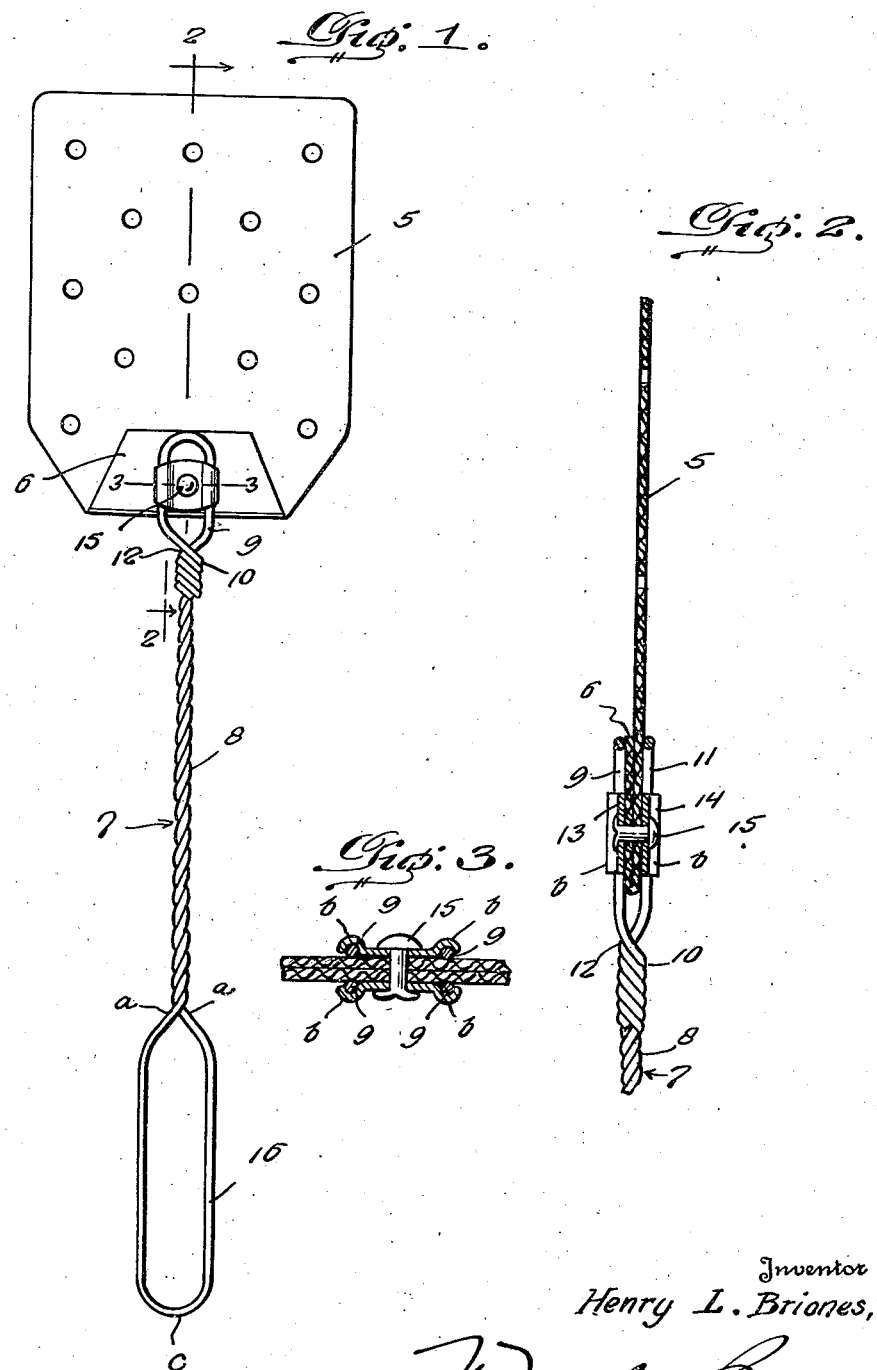
Inventor
Henry L. Briones, Patented Nov. 12, 1946

2,410,957

UNITED STATES PATENT OFFICE 2,410,957

FLY SWATTER

Henry L. Briones, East Irvington, N. Y.

Application November 3, 1944, Serial No. 561,725

1 Claim. (Cl. 43—137)

This invention appertains to new and useful improvements in devices for destroying flies and other insects and has more particular reference to a fly swatter.

The principal object of the present invention is to provide a fly swatter which because of its special construction will be far more durable than swatters now in general use.

Another important object of the invention is to provide a fly swatter which is constructed to retain its form and not become distorted as do the many types of cheap swatters now on the market.

Other important objects and advantages of the invention will become apparent to the reader of the following description.

In the drawing:

Figure 1 represents a side elevational view of the improved swatter.

Figure 2 is a fragmentary enlarged sectional view taken on the line 2—2 of Figure 1.

Figure 3 is a fragmentary enlarged sectional view taken on the line 3—3 of Figure 1.

Referring to the drawing wherein like numerals designate like parts, it can be seen that numeral 5 denotes a perforated sheet of canvas or some other suitable flexible material, the inner corner portions of the sheet being beveled off to provide a tapering tail piece 6, which in the construction of the swatter is folded inwardly upon itself, so as to reinforce this end of the sheet when the clamp of the handle is applied.

Numeral 7 generally refers to the improved handle which is constructed of a single length of wire material. The single length of wire material is bent to provide legs of equal length and starting at the points $a$, $a$ on each leg, the legs are twisted together to provide an elongated twisted stem 8.

One free end portion of the wire member is set to form an elongated loop 9 and this loop is closed by twisting the end portion of the same about the innermost end of the stem 8, as at 10.

The other free end portion of the wire member is formed to provide an elongated loop 11 which has its end secured also by twisting as at 12 about the innermost end of the stem 8.

A pair of substantially rectangular-shaped clamp plates 13, 14 having grooved portions $b$, $b$ for embracing the side portions of the loops 9, 11, are disposed across the loops and secured firmly in place by a rivet 15 passing through the plates and folded back tail portion 6 of the swatter sheet 5. Thus the loops are firmly clamped, one at each side of the reinforced portion 6 of the swatter sheet 5 and due to the broad bearing surface of this clamped connection, there is very little likelihood of the handle breaking away from the swatter sheet.

The portions of the wire member between the points $a$, $a$ and the bight $c$ are preferably spread apart as shown in Figure 1 to define a comfortably broad handle 16.

It can be seen, that the twisting backwardly of the portions 10, 12 of the loops 9, 11 onto the innermost portions of the twisted stem 8, rigidifies the stem at this point.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A fly swatter comprising a flexible swatter sheet, an elongated handle structure, said handle structure comprising an elongated wire member bent to form a pair of leg members, said members being twisted together for a substantial distance to define a rigid stem and a handle, the free ends of said leg members being formed to provide loops for engagement against opposite sides of one end portion of the swatter sheet, and fastener means for fastening the loops in clamped engagement with the sheet, the inner ends of the said loops being twisted about the innermost end of the twisted stem to rigidify this end of the stem.

HENRY L. BRIONES.